US008807654B2

(12) United States Patent
Funk et al.

(10) Patent No.: US 8,807,654 B2
(45) Date of Patent: Aug. 19, 2014

(54) STRUCTURE FOR A VEHICLE SEAT

(75) Inventors: Stefan Funk, Leichlingen (DE); Martin Zynda, Burscheid (DE); Stefan Josten, Rommerskirchen (DE); Bernd Engels, Remscheid (DE); Andreas Hansen, Waldenbuch (DE)

(73) Assignee: Johnson Controls Technology Company, Holland, MI (US)

( * ) Notice: Subject to any disclaimer, the term of this patent is extended or adjusted under 35 U.S.C. 154(b) by 557 days.

(21) Appl. No.: 12/669,470

(22) PCT Filed: Jun. 24, 2008

(86) PCT No.: PCT/EP2008/005092
§ 371 (c)(1),
(2), (4) Date: Aug. 24, 2010

(87) PCT Pub. No.: WO2009/010158
PCT Pub. Date: Jan. 22, 2009

(65) Prior Publication Data
US 2011/0006581 A1  Jan. 13, 2011

(30) Foreign Application Priority Data

Jul. 18, 2007 (DE) .......................... 10 2007 033 775
Nov. 9, 2007 (DE) .......................... 10 2007 053 962

(51) Int. Cl.
*B60N 2/64* (2006.01)
*B60N 2/68* (2006.01)

(52) U.S. Cl.
USPC ................................. 297/452.18; 297/DIG. 1

(58) Field of Classification Search
USPC ............... 297/458.18, 378.13, DIG. 1, 45.18, 297/DIG. 12
See application file for complete search history.

(56) References Cited

U.S. PATENT DOCUMENTS

| | | | |
|---|---|---|---|
| 6,233,826 B1 * | 5/2001 | Wycech | 29/897.1 |
| 6,347,836 B1 * | 2/2002 | Hayotte | 297/452.2 |
| 6,419,305 B1 | 7/2002 | Larsen | |
| 6,668,457 B1 * | 12/2003 | Czaplicki | 29/897.1 |
| 6,941,719 B2 * | 9/2005 | Busseuil et al. | 52/846 |
| 7,296,847 B2 * | 11/2007 | Czaplicki et al. | 296/187.02 |
| 7,838,100 B2 * | 11/2010 | McLeod et al. | 428/172 |
| 2006/0188694 A1 * | 8/2006 | McLeod et al. | 428/138 |

FOREIGN PATENT DOCUMENTS

| | | |
|---|---|---|
| DE | 29812841 A | 10/1998 |
| DE | 10142981 A1 | 3/2003 |
| DE | 10321289 A1 | 12/2004 |
| DE | 102004039366 | 3/2006 |

(Continued)

OTHER PUBLICATIONS

German Search Report mailed Apr. 16, 2008.

(Continued)

*Primary Examiner* — David R Dunn
*Assistant Examiner* — Timothy J Brindley
(74) *Attorney, Agent, or Firm* — Fletcher Yoder, P.C.

(57) ABSTRACT

A vehicle seat includes a backrest and a seat part, at least one of which has a structural element with a cavity. At least one part of the cavity receives an insert in the region of a filling. The insert is connected to the structural element in a positively locking fashion at least with regard to one type of movement. The insert is bonded to the filling.

9 Claims, 2 Drawing Sheets

(56) References Cited

FOREIGN PATENT DOCUMENTS

Figure 1:
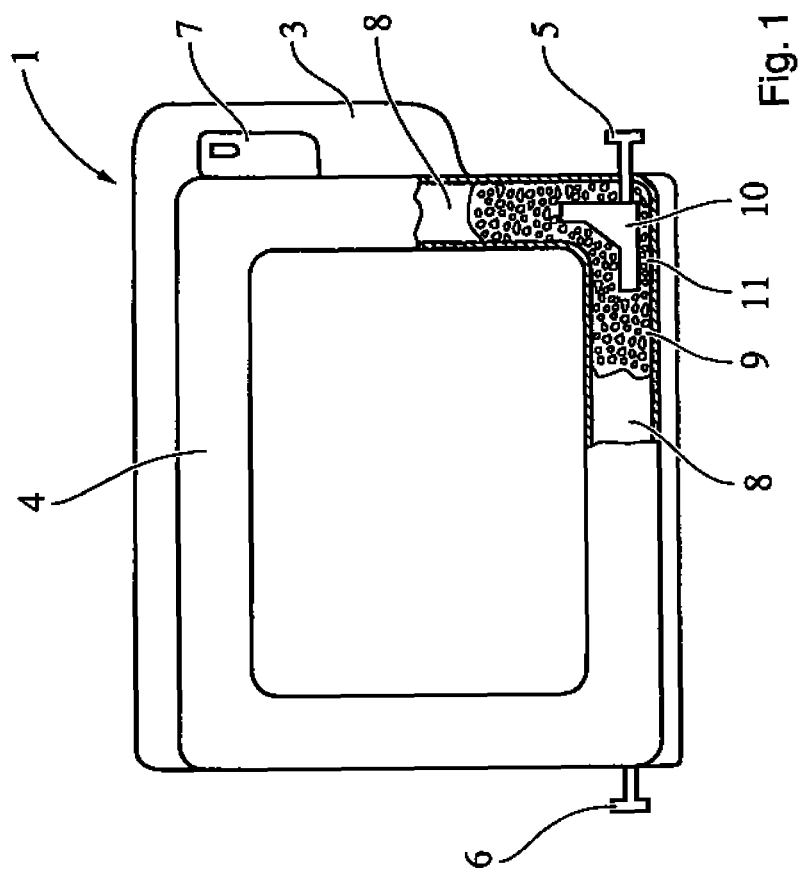

| | | |
|---|---|---|
| DE | 102004043860 | 3/2006 |
| JP | 63148298 A | 6/1988 |
| JP | 1069309 A | 3/1989 |
| JP | 11-165355 | 6/1999 |
| WO | 9919164 A | 4/1999 |
| WO | 0189875 A | 11/2001 |
| WO | 0192051 | 12/2001 |
| WO | 2005002950 A | 1/2005 |

OTHER PUBLICATIONS

PCT/ISA/237—PCT Searching Authority; PCT Written Opinion of the International Searching Authority (Apr. 2007).

Korean Notice of Preliminary Rejection mailed Aug. 31, 2013—KR Application No. 10-2010-7002987.

* cited by examiner

STRUCTURE FOR A VEHICLE SEAT

CROSS REFERENCE TO RELATED APPLICATIONS

This application claims priority from and the benefit of PCT Application No. PCT/EP2008/005092, filed on Jun. 24, 2008; German Patent No. DE 10 2007 033 775.4, filed on Jul. 18, 2007; and German Patent DE 10 2007 053 962.4, filed on Nov. 9, 2007; all entitled "Structure for a Vehicle Seat", which are herein incorporated by reference.

BACKGROUND

The invention relates to a structure for a vehicle seat, which structure comprises rigid structure components which form cavities and comprises a foam structure which at least partially fills the cavities.

Such vehicle seats are generally known. For example, the German laid-open specification DE 10 2004 039 366 A1 discloses a backrest for a motor vehicle seat having a stiffening structure. Furthermore, the German utility model DE 298 12 841 U1 discloses a reinforced structural element.

It is disadvantageous in the known vehicle seats that aspects of the ease or simplicity of assembly are not taken into consideration in a satisfactory manner, which leads to cost disadvantages in manufacturing.

SUMMARY

The object of the present invention is the targeted formation or introduction of an insert in or into a cavity of a structural element of a vehicle seat and its easy-to-assemble fastening.

The object is achieved by means of a vehicle seat having a backrest and having a seat part, with the backrest or the seat part having at least one structural element which has a cavity, with at least one part of the cavity having provided in it a filling which is introduced, with an insert being provided in the cavity in the region of the filling, with the insert being connected to the structural element in a positively locking fashion at least with regard to one type of movement, and with the insert being cohesively connected to the filling. In this way, ease of assembly of the vehicle seat or of the backrest or of the seat part of the vehicle seat is advantageously achieved, the insert need substantially only be positioned relative to the structural element, and the expanding filling subsequently leads to a permanent fixing of the insert with respect to the structural element. Here, it is advantageous in particular that the insert is connected to the structural element in a positively locking fashion at least with regard to one type of movement, that is to say, for example, the insert bears against a part of the inner wall of the cavity in such a way that, on account of surface structures such as beads, ribs or the like, definite positioning of the insert relative to the structural element is ensured by means of a simple insertion of the insert into the cavity. In the subsequent assembly method step of the expansion of the filling, the insert is then advantageously fixed with respect to the structural element in the position assumed after insertion by means of cohesive connection with the filling.

It is particularly preferable if the insert is cohesively connected at most to the filling, or at any rate is not welded to the structural element. In this way, the assembly step of welding the insert to the structural element, which was hitherto conventionally necessary for fastening the insert, is advantageously dispensed with.

Furthermore, it is preferable according to the invention for the filling to be provided at least partially between the insert and the structural element. In this way, particularly secure fastening of the insert in the assembly element is realized, wherein such an arrangement of the filling between the insert and the structural element (or the wall of the cavity) also leads to stiffening of the structural element, such that the stability requirements for a structural element of said type can be met even with a reduced material thickness, and therefore a lower weight and lower material costs.

According to the invention, it is also preferred that the filling has a foam support and a foam material, and that the foam material at least partially surrounds the foam support, with the foam material preferably completely surrounds the foam support. In this way, a stable connection of the insert to the structural element can be achieved in a particularly advantageous manner.

It is also particularly preferable according to the invention for a part of the insert to protrude out of the cavity through an opening in the structural element. In this way, it is advantageously possible, for example, for the side mount and/or the central mount of a backrest to be attached in a simple manner.

It is also preferable according to the invention for the foam material to be provided so as to expand in an electrocoating kiln. In this way, the foam reinforcement of the vehicle seat can be integrated quickly and in a simple manner in terms of assembly by means of one working step which is carried out in any case.

A further subject of the present invention is a method for producing a vehicle seat according to the invention, wherein the still-unexpanded filling, which has the foam support and the foam material, is positioned and/or fastened relative to a part of the structural element in a first step, wherein the cavity is formed in a second step, and wherein electrocoating is carried out in a third step, during which the foam material expands.

DRAWINGS

The figures schematically illustrate embodiments of the invention by way of example.

FIG. 1 schematically shows, as an example of a structural element, a seat back structure or a seat back segment of, for example, a split foldable backrest.

Figure 2:
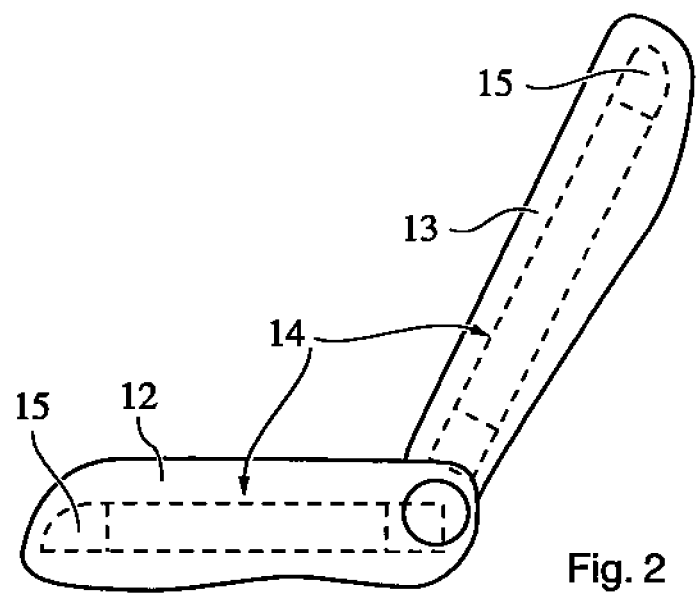
Figure 3:
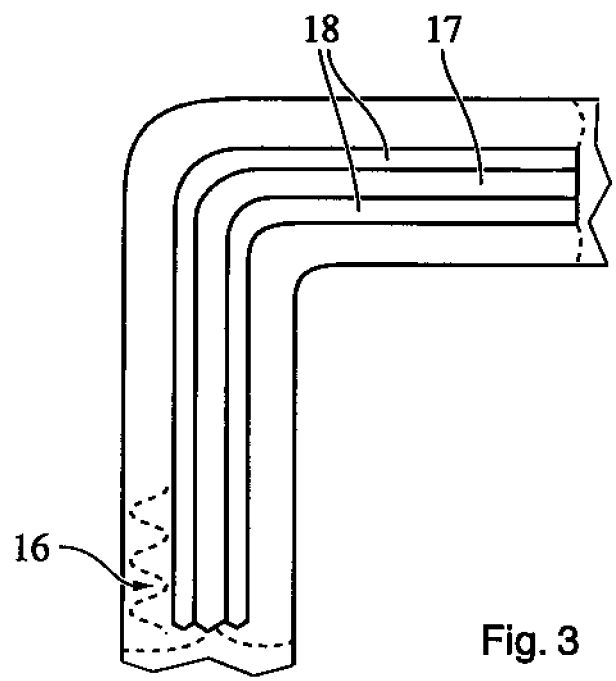

FIGS. 2 and 3 show schematic illustrations of a vehicle seat according to the invention.

DETAILED DESCRIPTION

By way of example, FIG. 1 schematically illustrates, as an example of a structural element of a vehicle seat, the rear view of a seat back segment 1 of a backrest. The seat back segment 1 or the seat back structure 1 (the figure shows only a seat back segment 1 of, for example, a split foldable backrest) comprises a base plate 3 and, placed thereon, a pressed part 4 which forms an encircling U-shaped profile, such that in particular an encircling hollow chamber is formed. As an alternative to a base plate 3 and a pressed part 4, the seat back segment 1 or the seat back structure 1 could also have the base plate 3 and four U-shaped profiles (not illustrated) placed thereon, which U-shaped profiles form a rectangular frame together with the base plate 3 and the corner pressed parts preferably placed thereon.

The base plate 3 and the pressed part 4 are composed for example substantially of metal, in particular sheet steel or aluminum, or substantially of plastic, for example glass-fiber-reinforced plastic. Here, different materials may also be paired with one another.

The seat back segments 1 are mounted in the vehicle so as to be rotatable independently of one another by means of a side mount 5 and a central mount 6. Rotary latch locks 7 arranged laterally on the upper side region of the seat back structure 1 serve to lock the seat back segments 1 to the vehicle body, in particular to the C pillar, in the upright use position.

The base plate 3 and pressed part 4 together form a hollow chamber 8 which runs around in the manner of a frame. It is provided according to the invention that fixtures of the backrest which project into the hollow chamber 8 from the outside, for example the side mount 5 and/or the central mount 6, are anchored in the hollow chamber 8 at least indirectly by means of a foam structure 9 which is introduced into the hollow chamber 8. A metal or plastic insert 10 which is connected to the fixture 9 is preferably provided in the hollow chamber 8, which insert 10 is spaced apart from the base plate 3 and/or pressed part 4, with the associated gap 11 being filled with the foam structure 9 in which the insert is embedded.

The introduction of the foam structure 9 may take place by inserting a finished foam part, which is shaped correspondingly to the hollow chamber 8 and the insert 10, before or during the welding of base plate 3 and pressed part 4. Alternatively, the foam structure 9 is first introduced after the welding process by means of an injection of a foamable mass into the hollow chamber 8. Particularly preferable, however, is the insertion of an in particular strand-like foam precursor, which has a three-dimensional shape, into the hollow chamber 8, which foam precursor is inserted into the hollow chamber 8 before, during or after the welding process and foams to form the foam structure 9 after an activation. The activation may take place for example as a result of a supply of heat during the painting of the seat back structure 1. For this purpose, use is preferably made of rigidly cross-linking foam systems, for example based on epoxide.

The seat back structure 1 is hereby considerably stiffened in the region which is highly loaded in the event of an accident. Furthermore, the loadability of the relevant fixtures is increased.

FIGS. 2 and 3 show a vehicle seat according to the invention. A vehicle seat of said type comprises a seat part 12 and a backrest 13. Both the seat part 12 and also the backrest 13 have in each case at least one structural element 14 which, in the context of the present invention, is formed in particular by the base plate 3 and the pressed part 4 which is placed thereon and forms an encircling U-shaped profile. A cavity 15 is provided at least in partial regions in said structural element 14, which cavity 15 is also referred to in the context of the present invention as a hollow chamber 8. The cavity 15 is for example in the form of a frame substantially following the outer shape or periphery of the backrest 13 or of the seat part 12, and is substantially angular, rectangular, triangular or angled in cross section. According to the present invention, at least one partial region of the cavity 15, and preferably also only one partial region of the cavity 15, has arranged in it a filling 16 and the insert 10 (not shown in FIGS. 2 and 3 for the sake of simplicity), with the filling 16 comprising a foam material 18. The filling 16 or the foam material 18 is also referred to in the context of the present invention as a foam structure 9. The filling 16 or the foam material 18 may duly be injected from the outside by injecting an easily deformable or foaming material (for example through an opening in the cavity 15), but it is preferable according to the present invention for the filling 16 to be introduced into the cavity 15 in the form of a still-unexpanded and substantially hard, or at any rate substantially non-adhesive, foam material 18 which is connected to a foam support 17, or else fastened to or positioned on a structure part which forms a cavity wall, and for the insert 10 to be inserted before the fastening or positioning of the filling 16 or after the fastening or positioning of the filling 16, with the cavity 15 then being formed by means of a connection to another structure part. In a subsequent step, the foam material 18 is then expanded, as a result of which the foam material 18 then at least partially or preferably completely surrounds the foam support 17. To illustrate this, FIG. 3 shows a detail of a cavity 15 formed in the structural element 14, with the filling 16, that is to say the foam support 17 and the foam material 18, being illustrated in the cavity 15 in the unexpanded state of the foam material 18 by means of solid lines, and with dashed lines or dots illustrating the limit of the foam material 18 in the foamed state. According to the invention, the expansion of the foam material 18 may take place in particular by means of a KTL bath treatment (not illustrated). This is to be understood to mean a treatment in an electrocoating kiln or a cathodic dip coating process in which the structural elements 14 of the vehicle seat are raised to a temperature of for example approximately 160° to approximately 180° over for example approximately 5 minutes to approximately 15 minutes, preferably approximately 10 minutes.

LIST OF REFERENCE NUMERALS

1 Seat back structure, seat back segment
3 Base plate
4 Pressed part
5 Side mount
6 Central mount
7 Rotary latch lock
8 Hollow chamber
9 Foam structure
10 Insert
11 Gap
12 Seat part
13 Backrest
14 Structural element
15 Cavity
16 Filling
17 Foam support
18 Foam material

The invention claimed is:

1. A vehicle seat comprising a backrest and a seat part, the backrest or the seat part having at least one structural element comprising a cavity, at least one part of the cavity comprising a filling, wherein an insert is provided in the cavity in the region of the filling, the insert being connected to the structural element in a positively locking fashion at least with regard to one type of movement, and the insert being secured to the structural element only by the filling, and wherein a part of the insert is a mounting device which protrudes out of the cavity through an opening in the structural element and the filling comprises a foam material.

2. The vehicle seat as claimed in claim 1, wherein the filling is provided at least partially between the insert and the structural element.

3. The vehicle seat as claimed in claim 1, wherein the filling comprises a foam support.

4. The vehicle seat as claimed in claim 3, wherein the foam material at least partially surrounds the foam support.

5. The vehicle seat as claimed in claim 3, wherein the foam material is configured to expand in an electrocoating kiln.

6. A method for producing a vehicle seat as claimed in claim 4, comprising positioning and/or fastening a still-unexpanded filling comprising the foam support and the foam material relative to a part of the structural element, forming the cavity, and expanding the foam material.

7. The method as claimed in claim 6, wherein the foam material is expanded in an electrocoating operation.

8. The vehicle seat as claimed in claim 4, wherein the foam material completely surrounds the foam support.

9. A vehicle seat assembly comprising:
   a backrest; and
   a seat bottom;
   wherein the backrest, the seat bottom, or both, comprises:
      a structural element having a cavity and an opening extending into the cavity;
      an insert body disposed completely within the cavity;
      a mounting device extending from the insert body through the opening; and
      a filling disposed within the cavity around the insert body, wherein the insert body is secured to the structural element only by the filling and the filling comprises a foam material.

\* \* \* \* \*